March 17, 1964   J. H. SCHLAECHTER   3,125,680
SHEET GAUGING HEAD STRUCTURE HAVING UNIVERSAL
PASS LINE ANGLE ADJUSTMENT
Filed Dec. 18, 1959

INVENTOR
John H. Schlaechter
by Anthony D. Cennamo

United States Patent Office 3,125,680
Patented Mar. 17, 1964

3,125,680
SHEET GAUGING HEAD STRUCTURE HAVING UNIVERSAL PASS LINE ANGLE ADJUSTMENT
John H. Schlaechter, Columbus, Ohio, assignor to Industrial Nucleonics Corporation, a corporation of Ohio
Filed Dec. 18, 1959, Ser. No. 860,522
4 Claims. (Cl. 250—106)

This invention relates generally to non-contacting radiation gauges for measuring a continuous sheet and, more particularly, to a unique method and means for facilitating the mounting of such a gauge in measuring relation to an inclined sheet.

Numerous industrial applications call for the continuous measurement of a sheet product. Materials such as plastics, strip steel and paper are commonly produced in a continuous sheet by extrusion or other processes. In the interest of economy, it is important that certain characteristics of the sheet product be maintained within prescribed limits of manufacturing tolerances. Rigorous control is ideally accomplished only through accurate and continuous measurement of the product characteristic.

Within recent years, the radiation gauge has seen increasing use as a non-contacting meter of a product characteristic, e.g., density or thickness. A beam of radiation emanating from a source is directed toward the sheet to be measured and a detector such as an ionization chamber translates radiation transmitted through the sheet into an electrical signal indicative of the variation in the property of interest. The accuracy of translation is dependent upon many factors which must be maintained constant or the effects eliminated by standardization procedures. Source decay, component aging and the source detector geometry are variables which will affect the accuracy of data obtained. The standardization procedures described in U.S. Letters Patent 2,829,268, issued April 1, 1958 to H. R. Chope may be advantageously utilized to compensate for some of these variables, but the source-detector geometry must be rigorously maintained by intelligent use of mechanical construction practices. It is particularly important that the sheet to be examined and the gauging head of the instrument bear a definite immutable geometric relation. When the pass line of the sheet through the gauging head is horizontal, few problems are encountered in designing a suitable gauge mounting; but, oftentimes the sheet is supported between rolls located at different horizontal levels and the sheet does not travel in a horizontal plane. As a result, the pass line must be inclined to the horizontal and the vertical axis of the gauging head must be correspondingly displaced.

In the past, it has been the practice to tilt the entire mounting frame. Besides displacing the center of gravity and sacrificing stability, a considerable amount of plant space in the machine direction of the sheet is required to accommodate a mounting arrangement of this nature. Usually, plant space is already at a premium and size limitations must be imposed on the mounting frame before the gauge can be placed "on line." In many cases, the size must be so drastically reduced that the gauging head is inadequately supported not only for accurate measurement but also for complete plant safety. Additionally, it has been necessary to custom design each support to adapt the gauge to processes having different pass lines. The exorbitant cost of each installation is immediately apparent.

The present invention provides the solution to these and related problems. In accordance with the present invention the gauging head of a radiation gauge is movable with respect to the mounting frame. The mounting frame is either suspended or base-mounted in a conventional manner and the gauging head is rotatable in a vertical plane to permit the pass line thereof to be reoriented parallel to the surface of the sheet to be measured.

Accordingly, it is a primary object of the present invention to provide a gauging head mounting having a readily adjustable passline.

It is another object of the present invention to provide a gauging head mounting that requires a minimum of plant space for erection.

It is also an object of the present invention to provide a gauging head mounting that eliminates costly custom engineering individual industrial applications.

It is yet another object of the present invention to provide a guaging head mounting that permits accurate measurement of a sheet without the awkard, hazardous and expensive mounting structures heretofore required.

The foregoing objects as well as numerous other advantages and features of the present invention will become more apparent when the following description is taken in conjunction with the accompanying drawings, in which.

Figure 1:
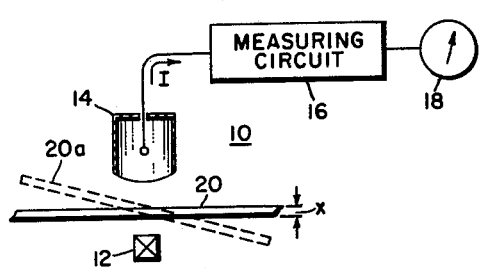
FIG. 1 is a diagrammatic illustration of a typical transmission radiation gauge.

With reference to the drawings and specifically to FIG. 1, a radiation gauge 10 comprises a source of radiation 12, a radiation detector such as an ionization chamber 14, measuring circuits 16, and an indicator 18. A sheet of material 20 is passed between the source 12 and the chamber 14 and is examined for a particular physical property, e.g., mass per unit area $x$.

Figure 2:
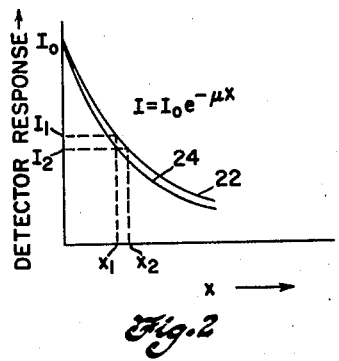
FIG. 2 is a graph of the response of the gauge shown in FIG. 1.

The electrical current $I$ generated by the chamber 14 is a function of $x$ and varies exponentially as shown by the curve 22 of FIG. 2. The maximum value of current $I_0$ occurs when the mass of absorbing medium is reduced to a minimum, i.e., when there is no material in the measuring gap between the source and detector. When a material of mass per unit area $x_1$, is inserted in the gap, a current $I_1$, is indicated at 18. With suitable calibration, the indicator 18 may be calibrated to read mass per unit area quite accurately. However, the reproducibility of measurement depends greatly on the constancy of the geometrical relationship of source, detector and material to be measured. Changing the distance between the source 12 and chamber 14, changing the distance of the material 20 with respect to either the source or the chamber, or changing the pathlength of radiation through the sheet by tilting it to the position 20a in FIG. 1 will significantly alter the results of measurement.

Referring again to FIG. 2, curve 24 illustrates the response of the gauge 10 to the mass characteristic $x$ of the tilted sheet 20a. Now, if a sheet having a mass per unit area $x_1$, is inserted in the position 20a, a lesser chamber current $I_2$ flows due to the increase in absorption by the sheet. Indicator 18 will show a mass per unit area $x_2$ much greater than is actually the case. Thus, the indicated mass will be different if the sheet 20 is tilted. In practice, it is common to measure radiation passing normal to the plane of the sheet 20 and to calibrate the instrument accordingly. However, in many industrial applications, it is difficult to mount the source and detector units so that this condition obtains.

Figure 3:
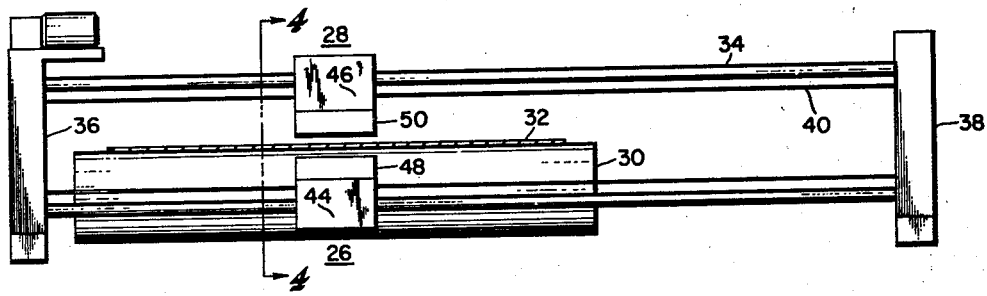
FIG. 3 is a front elevation of a novel gauge mounting constructed in accordance with the teachings of the present invention.

Referring now to FIG. 3, a preferred embodiment of the present invention comprises a traversing transmission gauge including a lower source unit 26 and an upper detector unit 28 fixedly spaced therefrom. A roll 30 supports a sheet 32 for movement between the source and detector units. The units 26, 28 are mounted on tubular supports 34 extending across the sheet 32 and secured to a pair of upstanding stanchions 36 and 38 base mounted at opposite edges of the sheet 32. A pair of tubular supports 34 are utilized above and below the sheet 32 for stability. The source and detector units 26, 28 may be adapted for concomitant lateral movement with respect to the sheet 32 by means of a motor-driven chain 49 connected to each unit 26, 28. The source and detector units are respectively provided with carriages 44 and 46 rollingly mounted on tubular supports 34 and housings 48 and 50 movable with respect to the carriages in a manner described hereinafter.

Figure 4:
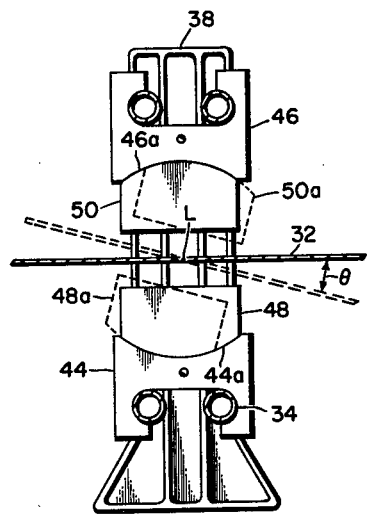
FIG. 4 is a section on the line 4—4 of FIG. 3.

With reference now to FIG. 4, each carriage is provided with an inwardly directed circular concavity 44a and 46a for receiving corresponding convex surfaces of the housings 48 and 50 respectively. Every point on the circular arcs 44a, 46a is equi-distant from a line L passing through the center of the sheet 32 parallel to the inwardly directed faces of the housings 48 and 50 and perpendicular to the direction of sheet movement. With this scheme, when it is desired to measure a sheet in position 32a, the source housing 48 and detector housing 50 are revolved about L in a clockwise direction through an angle $\theta$ equal to the deviation in sheet travel from a horizontal reference plane.

Figure 5:
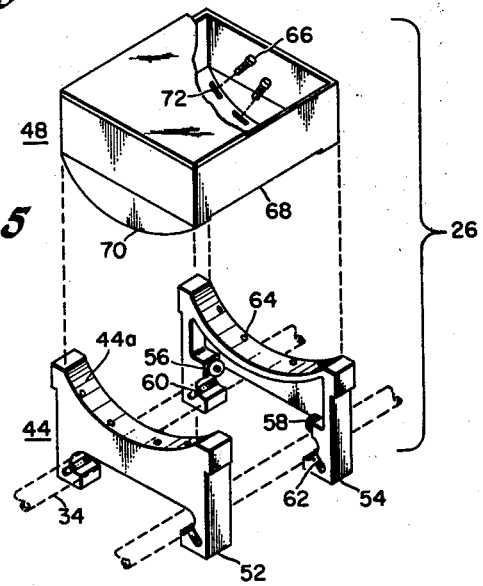
FIG. 5 is an exploded perspective view showing mechanical details of construction.

The preferred mechanical construction taught by the present invention for accomplishing the objects thereof will be apparent from the illustration in FIG. 5. Referring to FIG. 5, the carriage 44 of the source unit 26 comprises a pair of cast aluminum cradles 52 and 54 spaced apart on the supporting tubes 34 shown in phantom for simplification. Each cradle is supported by a pair of wheels 56 and 58 mounted in rolling engagement with the upper surface of each tube 34. Another pair of wheels 60 and 62 is also provided to facilitate movement. Wheels 60, 62 are preferably mounted on axes displaced by $\pi/4$ radians from the horizontal to enable the wheels to engage the outer lower periphery of each tube 34. In this manner, transverse movement of the carriage 44 with respect to the longitudinal dimension of the support tubes 34 is substantially eliminated. Tapped holes 64 are provided in the concavity 44a to receive machine bolts as at 66.

The source housing 48 comprises a generally rectangular box 68 preferably constructed of aluminum in which the radioactive material and associated shielding and shutter mechanism may be mounted. Housing 48 is fabricated with a circular arcuate bottom 70 having slots 72 provided at each end. Bottom 70 may be raised at opposite ends of the housing 48 and finished to mate smoothly with the concavity 44a of each cradle 52, 54. Although only the source housing 44 has been shown and described in detail, it is believed that the construction of the detector housing will be obvious to those skilled in the art. It should be noted that the radius of curvature is drawn from the line L and may be different for each housing if the sheet 32 passes closer to one housing than the other and if they are identical in physical dimension.

In assembling the apparatus, the cradles 52 and 54 are oriented as shown and placed on the tubes 34. The tubes 34 may then be secured to the stanchions 36 and 38. Next, the source housing 48 is positioned in the cradles 52, 54 to achieve the desired pass line. Bolts 66 may then be secured in slots 72 appropriately registered with tapped holes 64. Alternatively, a gearing arrangement may be provided to rotate the housing 48 with respect to the carriage 44. A similar procedure is followed for the upper detector housing 50.

Throughout this discussion a transmission gauge has been described, however, the teachings of the present invention are equally applicable to a reflection type gauge where an integral source-detector unit scans one side of the sheet to be measured. The necessary modifications of the preferred embodiment should be apparent to those skilled in the art.

Many additional modifications, deletions, substitutions and omissions may be made to the preferred embodiment herein set forth without destroying the true spirit and scope of the present invention; accordingly, the bounds of the present invention are fixed only by the appended claims.

I claim:

1. A radiation device including a source of penetrating radiation and a radiation detector for measuring a physical property of a laterally-extended sheet of material that may be inclined with respect to the horizontal, said source and detector defining a beam of radiation, apparatus comprising vertical support means at opposite edges of said sheet, upper and lower horizontal support means extending adjacent opposite surfaces of said sheet and connected between said vertical support means, individual housings for mounting said source and said detector, each of said housings having a circular convex member integral therewith, carriage means connected to each of said horizontal support means for independently supporting each of said housings between said horizontal support means and said sheet, each of said carriage means having a circular concave surface adjacent said sheet for receiving said convex member of said housing, means providing for the relative movement of each of said convex members in said associated concave surface whereby the axis of said radiation beam is maintained perpendicular to said sheet regardless of the inclination of said sheet relative said vertical support means, and means for releasably securing each of said convex members in the concave surface associated therewith.

2. The subcombination as set forth in claim 1 in which the radius of curvature of each of said concave surfaces extends from a horizontal line passing through the center of said sheet.

3. The subcombination as set forth in claim 1 in which said carriage means includes at least a first pair of wheels mounted in rolling engagement with the upper periphery of each of said horizontal support means and a second pair of wheels mounted in rolling engagement with the outer periphery of each of said horizontal support means.

4. The subcombination as set forth in claim 1 in which said releasable securing means comprises a plurality of tapped holes in each of said concave surfaces, a plurality of elongated slots in each of said convex bottom members, a plurality of bolts for threadedly engaging said tapped holes, means for passing at least one of said bolts through any of said slots registered with said holes after said relative movement, and means for securing said bolt in said hole to prevent further relative movement of said bottom member with respect to said associated concave surface.

References Cited in the file of this patent

UNITED STATES PATENTS

| | | |
|---|---|---|
| 2,528,724 | Herzog | Nov. 7, 1950 |
| 2,870,336 | Fountain et al. | Jan. 20, 1959 |
| 2,879,399 | Friedman | Mar. 24, 1959 |
| 2,901,629 | Friedman | Aug. 25, 1959 |
| 2,909,660 | Alexander | Oct. 20, 1959 |
| 2,937,275 | Thourson et al. | May 17, 1960 |
| 2,967,242 | Hoblen | Jan. 3, 1961 |
| 3,010,020 | Alcock | Nov. 21, 1961 |

FOREIGN PATENTS

| | | |
|---|---|---|
| 1,195,082 | France | May 11, 1959 |
| 1,214,910 | France | Nov. 16, 1959 |
| 922,795 | Germany | Jan. 24, 1955 |